(12) United States Patent
Kim et al.

(10) Patent No.: US 9,198,094 B2
(45) Date of Patent: Nov. 24, 2015

(54) METHOD FOR SETTING SEARCH SPACE FOR HANDOVER OF RELAY NODE IN WIRELESS COMMUNICATION SYSTEM, AND DEVICE THEREFOR

(75) Inventors: Hakseong Kim, Anyang-si (KR); Kijun Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 13/985,469

(22) PCT Filed: Jan. 18, 2012

(86) PCT No.: PCT/KR2012/000430
§ 371 (c)(1),
(2), (4) Date: Aug. 14, 2013

(87) PCT Pub. No.: WO2012/115352
PCT Pub. Date: Aug. 30, 2012

(65) Prior Publication Data
US 2013/0322324 A1    Dec. 5, 2013

Related U.S. Application Data

(60) Provisional application No. 61/446,448, filed on Feb. 24, 2011, provisional application No. 61/448,192, filed on Mar. 1, 2011.

(51) Int. Cl.
*H04W 4/00* (2009.01)
*H04W 36/00* (2009.01)
(Continued)

(52) U.S. Cl.
CPC ...... *H04W 36/0055* (2013.01); *H04W 36/0077* (2013.01); *H04L 5/0032* (2013.01); *H04W 74/006* (2013.01); *H04W 92/045* (2013.01)

(58) Field of Classification Search
CPC ............ H04W 36/08; H04W 36/0077; H04W 74/006; H04W 36/0055
See application file for complete search history.

(56) References Cited

U.S. PATENT DOCUMENTS 7,733,827 B2 * 6/2010 Kim et al. ............. 370/328
8,160,025 B2 * 4/2012 Lee et al. .............. 370/331
(Continued)

FOREIGN PATENT DOCUMENTS

| KR | 1020100091926 A | 8/2010 |
|---|---|---|
| KR | 1020100094424 A | 8/2010 |
| KR | 1020100097063 A | 9/2010 |

OTHER PUBLICATIONS

R1-101321, TSG-RAN WG1#60, R-PDCCH blind decoding for Frequency Diversity and Frequency Selective R-PDCCH Transmissions, Feb. 26, 2010, p. 1-5.

*Primary Examiner* — Brian O'Connor
(74) *Attorney, Agent, or Firm* — Dentons US LLP

(57) ABSTRACT

Disclosed in the present invention is a method for a relay to execute a random access procedure in a wireless communication system. More particularly, the present invention comprises the steps of: transmitting a random access preamble to a target cell; receiving a downlink signal from the target cell; obtaining a relay node-physical downlink control channel (R-PDCCH) by blind decoding the downlink signal; and receiving a random access response message on the basis of the R-PDCCH, wherein a search space for the blind decoding is located in a data region of a subframe, and information on the search space is delivered from the target cell to a serving cell of the relay node, and then signaled to the relay node.

8 Claims, 11 Drawing Sheets

(51) Int. Cl.
  *H04L 5/00* (2006.01)
  *H04W 92/04* (2009.01)
  *H04W 74/00* (2009.01)

(56) References Cited

U.S. PATENT DOCUMENTS

| | | | |
|---|---|---|---|
| 8,249,020 B2 * | 8/2012 | Qiu | 370/331 |
| 8,331,326 B2 * | 12/2012 | Wang et al. | 370/332 |
| 8,644,277 B2 * | 2/2014 | Zhang et al. | 370/338 |
| 8,797,922 B2 * | 8/2014 | Chen et al. | 370/279 |
| 8,817,732 B2 * | 8/2014 | Kim et al. | 370/329 |
| 8,824,397 B2 * | 9/2014 | Peters | 370/329 |
| 8,976,806 B2 * | 3/2015 | Pasad et al. | 370/441 |
| 2010/0275083 A1 * | 10/2010 | Nam et al. | 714/748 |
| 2012/0051270 A1 * | 3/2012 | Chen et al. | 370/279 |
| 2012/0236829 A1 * | 9/2012 | Takano et al. | 370/331 |

* cited by examiner

FIG. 2
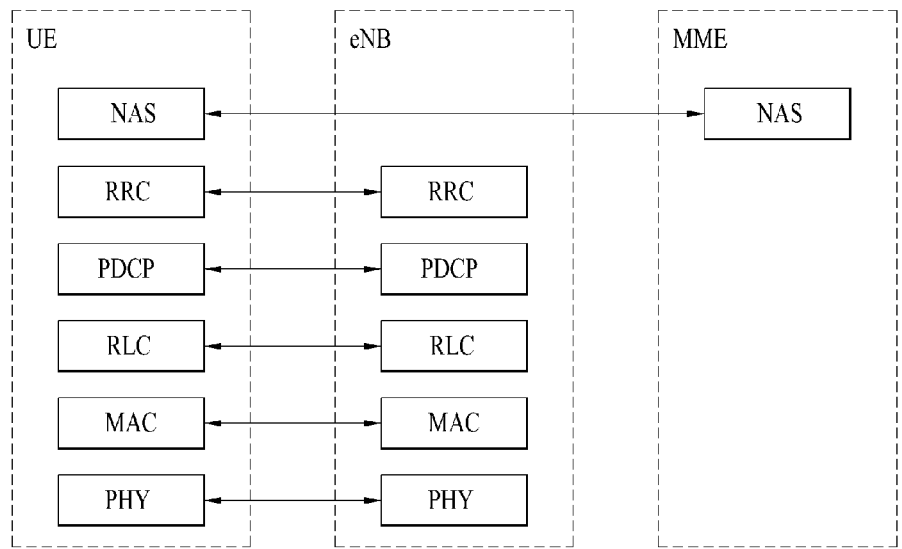
(a) contol - plane protocol stack
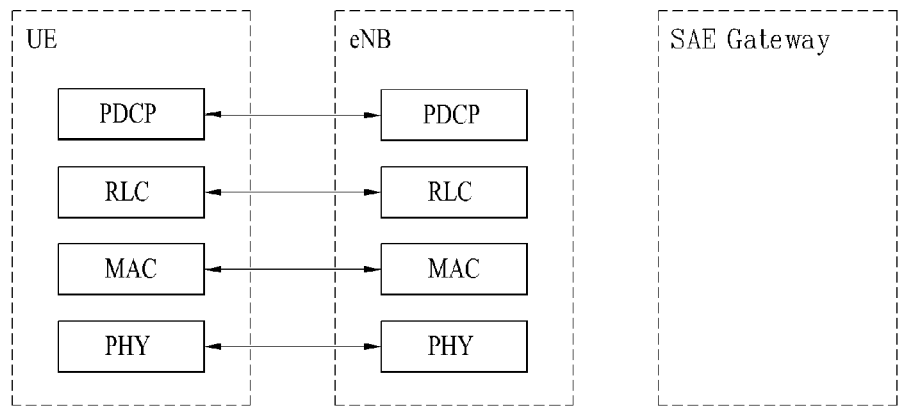
(b) user - plane protocol stack FIG. 6
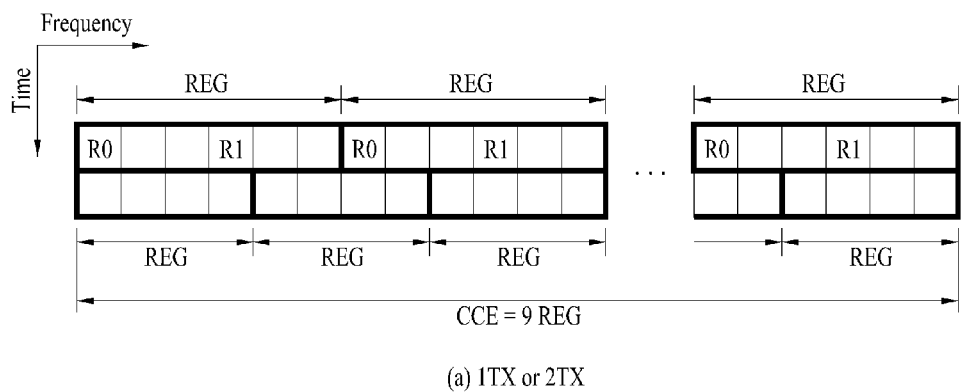
(a) 1TX or 2TX
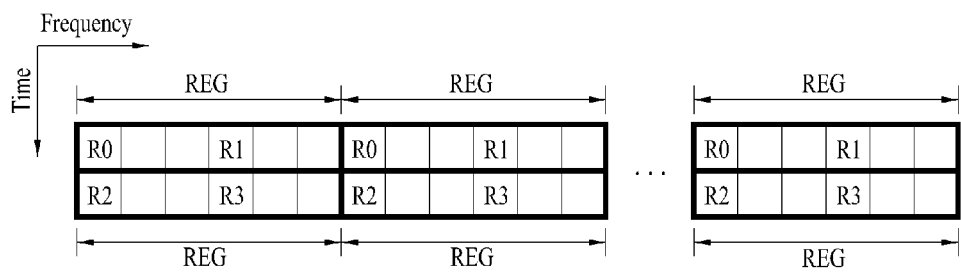
(b) 4 TX
FIG. 7
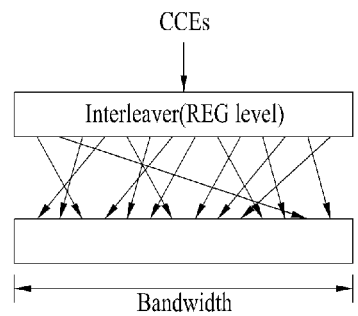

METHOD FOR SETTING SEARCH SPACE FOR HANDOVER OF RELAY NODE IN WIRELESS COMMUNICATION SYSTEM, AND DEVICE THEREFOR

This application is a 35 USC §371 National Stage entry of International Application No. PCT/KR2012/000430 filed on Jan. 18, 2012, and claims priority to U.S. Provisional Application Nos. 61/446,448 filed on Feb. 24, 2011; and 61/448,192, filed Mar. 1, 2011, all of which are incorporated by reference in their entirety herein.

TECHNICAL FIELD

The present invention relates to a wireless communication system, and more particularly, to a method for setting a search space for handover of a relay node in a wireless communication system and an apparatus therefor.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method for setting a search space for handover of a relay node in a wireless communication system and an apparatus therefor.

Technical Solution

The object of the present invention can be achieved by providing a method of performing a random access procedure for handover at a relay node in a wireless communication system, the method including transmitting a random access preamble to a target cell, receiving a downlink signal from the target cell, performing blind decoding with respect to the downlink signal and acquiring a relay node-physical downlink control channel (R-PDCCH), and receiving a random access response message based on the R-PDCCH, wherein the search space for performing blind decoding is located in a data region of a subframe, and wherein information on the search space is sent from the target cell to a serving cell of the relay node and is signaled to the relay node.

In another aspect of the present invention, provided herein is a relay node in a wireless communication system including a wireless communication module configured to transmit a random access preamble to a target cell and to receive a downlink signal from the target cell, and a processor configured to perform blind decoding with respect to the downlink signal, to acquire a relay node-physical downlink control channel (R-PDCCH), and to detect a random access response message based on the R-PDCCH, wherein the search space for performing blind decoding is located in a data region of a subframe, and wherein information on the search space is sent from the target cell to a serving cell of the relay node and is signaled to the relay node.

The information on the search space may be included in a handover response message sent from the target cell to the serving cell. The serving cell and the target cell may set the same search space for the relay node. The information on the search space may be signaled from the serving cell to the relay node through a higher layer signal.

In another aspect of the present invention, provided herein is a method of performing a random access procedure for handover at a relay node in a wireless communication system, the method including stopping a service provided to a cell of the relay node, transitioning the relay node to a user equipment (UE) mode for communication with a base station, transmitting a random access preamble to a target base station, receiving a random access response message from the target base station through a physical downlink control channel and a physical downlink shared channel, transitioning the relay node to a relay node mode for communication with a UE after the random access procedure has been finished, and resuming the service provided to the cell of the relay node.

In another aspect of the present invention, provided herein is a relay node in a wireless communication system including a wireless communication module configured to communicate with a serving base station, a target base station and a user equipment (UE), and a processor configured to process a signal transmitted and received through the wireless communication module, wherein the processor stops a service provided to a cell of the relay node before transmitting a random access preamble to the target base station and transitions the relay node to a UE mode for communicating with the serving base station or the target base station, wherein the wireless communication module receives a random access response message from the target base station through a physical downlink control channel and a physical downlink shared channel, and wherein the processor transitions the relay node to a relay node mode for communicating with the UE after the random access procedure has been finished and resumes the service provided to the cell of the relay node.

Advantageous Effects

According to the embodiments of the present invention, a relay node can efficiently perform handover in a wireless communication system.

The effects of the present invention are not limited to the above-described effects and other effects which are not described herein will become apparent to those skilled in the art from the following description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3$^{rd}$ Generation Partnership Project (3GPP) radio access network standard.

FIG. 6 is a diagram showing a resource unit used to configure a control channel.

FIG. 7 is a diagram showing an example of distributing CCEs in a system bandwidth.

BEST MODE

Figure 1:
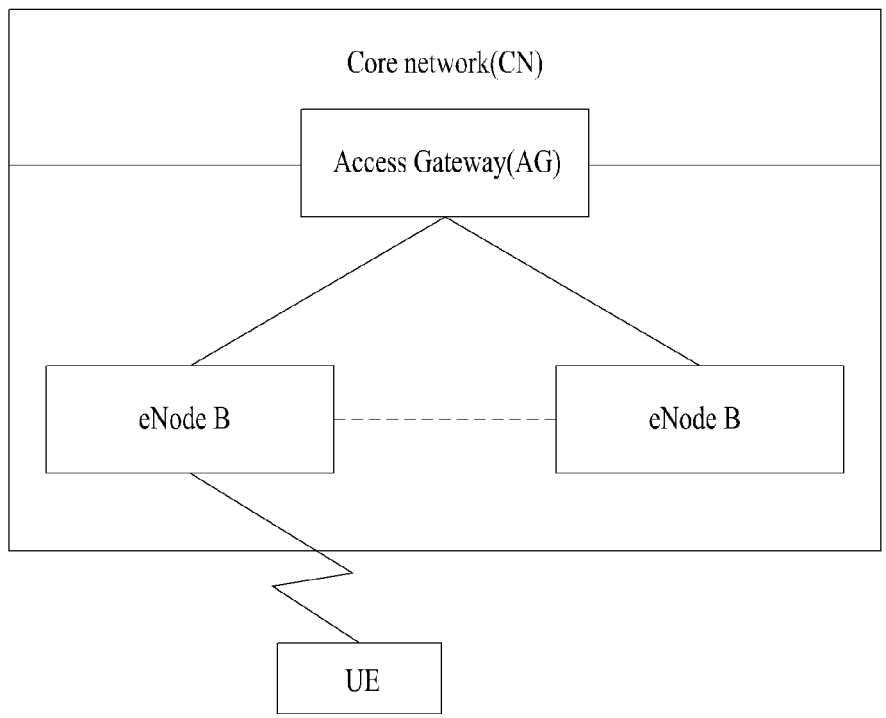
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a 3$^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
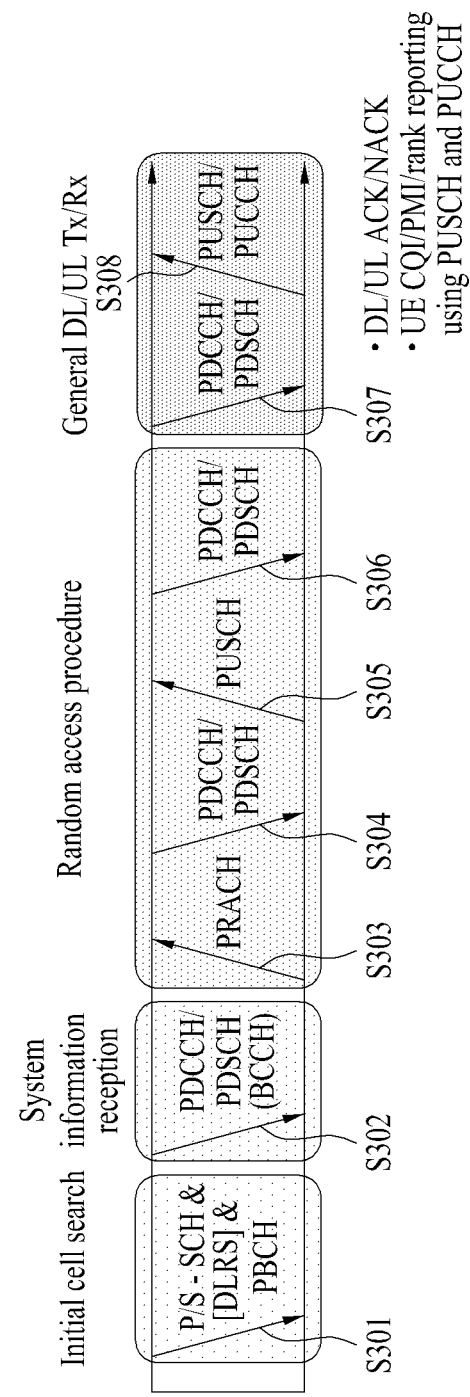
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which has performed the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
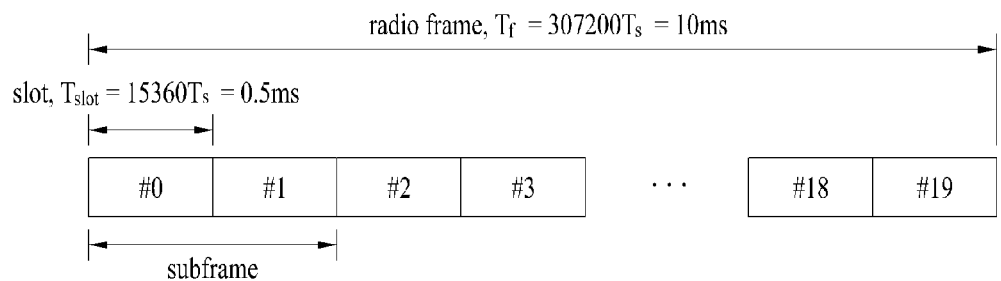
FIG. 4 is a diagram showing the structure of a radio frame used in an LTE system.

FIG. 4 is a diagram showing the structure of a radio frame used in a Long Term Evolution (LTE) system.

Referring to FIG. 4, the radio frame has a length of 10 ms ($327200 \cdot T_s$) and includes 10 subframes with the same size. Each of the subframes has a length of 1 ms and includes two slots. Each of the slots has a length of 0.5 ms ($15360 \cdot T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
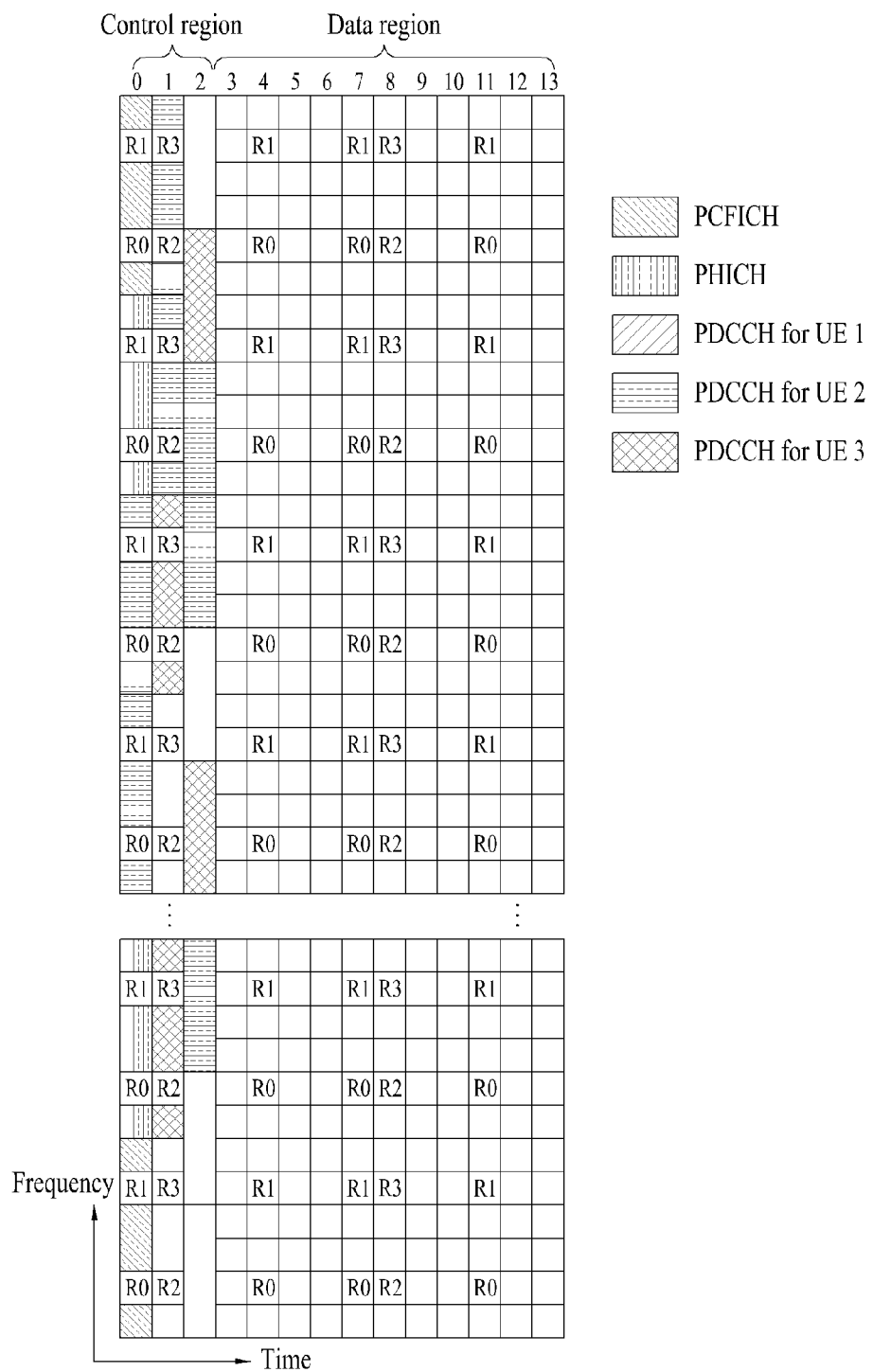
FIG. 5 is a diagram showing the structure of a downlink subframe used in an LTE system.

FIG. 5 is a diagram showing a control channel included in a control region of a subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or a pilot signal for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is set prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH indicates a channel for transmitting DL ACK/NACK information for UL HARQ. The PHICH includes one REG and is scrambled on a cell-specific basis. ACK/NACK is indicated by one bit and is modulated by binary phase shift keying (BPSK). The modulated ACK/NACK is spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in a frequency domain and/or a time domain, in order to obtain diversity gain.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information on data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information on the received PDCCH.

FIG. 6 is a diagram showing a resource unit used to configure a control channel. In particular, FIG. 6(a) shows the case in which the number of transmit antennas of an eNodeB is 1 or 2 and FIG. 6(b) shows the case in which the number of transmit antennas of an eNodeB is 4. A reference signal (RS) pattern varies according to the number of transmit antennas but a method of setting a resource unit related to a control channel does not vary.

Referring to FIG. 6, the basic resource unit of the control channel is an REG. The REG includes four neighboring resource elements (REs) except for an RS. The REG is denoted by a thick line in FIG. 6. A PCFICH and a PHICH include four REGs and three REGs, respectively. The PDCCH is configured in control channel element (CCE) units and one CCE includes nine REGs.

A UE is set to confirm $M^{(L)}(\geq L)$ CCEs which are arranged continuously or according to a specific rule, in order to determine whether a PDCCH having L CCEs is transmitted thereto. The UE may consider a plurality of L values for PDCCH reception. A set of CCEs which must be confirmed by the UE for PDCCH reception is referred to as a search space. For example, the LTE system defines the search space as shown in Table 1.

TABLE 1

| Type | Search space $S_k^{(L)}$ Aggregation level L | Size [in CCEs] | Number of PDCCH candidates $M^{(L)}$ | DCI formats |
|---|---|---|---|---|
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

Here, a CCE aggregation level L denotes the number of CCEs configuring a PDCCH, $S_k^{(L)}$ denotes a search space of a CCE aggregation level L, $M^{(L)}$ denotes the number of candidate PDCCHs monitored in a search space of the aggregation level L.

The search space may be divided into a UE-specific search space in which only access of a specific UE is allowed and a common search space in which access of all UEs within a cell is allowed. The UE monitors the common search space having a CCE aggregation level of 4 and 8 and monitors the UE-specific search space having a CCE aggregation level of 1, 2, 4 and 8. The common search space and the UE-specific search space may overlap each other.

In addition, the location of a first CCE (having a smallest index) in the PDCCH search space applied to a certain UE with respect to each value L is changed according to UEs per subframe. This is referred to as PDCCH search space hashing.

FIG. 7 is a diagram showing an example of distributing CCEs in a system bandwidth. Referring to FIG. 7, a plurality of logically continuous CCEs is input to an interleaver. The interleaver performs a function for interleaving the plurality of CCEs in REG units. Accordingly, frequency/time resources configuring one CCE are scattered in the overall frequency/time domain within a control region of a subframe. As a result, the control channel is configured CCE units but interleaving is performed in REG units. Accordingly, frequency diversity and interference randomization gain can be maximized.

Figure 8:
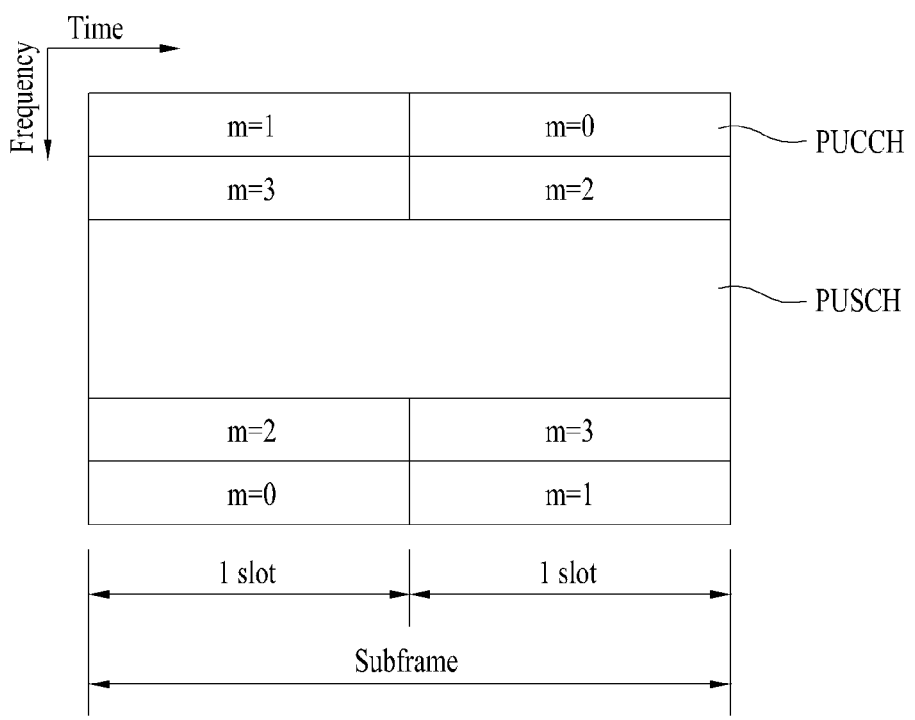
FIG. 8 is a diagram showing the structure of an uplink subframe used in an LTE system.

FIG. 8 is a diagram showing the structure of an uplink subframe used in an LTE system.

Referring to FIG. 8, the uplink subframe may be divided into a region to which a PUCCH for transmitting control information is allocated and a region to which a PUSCH for transmitting user data is allocated. An intermediate portion of the subframe is allocated to the PUSCH, and both sides of a data region are allocated to the PUCCH in the frequency domain. The control information transmitted on the PUCCH includes the ACK/NACK used for HARQ, a Channel Quality Indicator (CQI) indicating a downlink channel state, a Rank Indicator (RI) for MIMO, and a Scheduling Request (SR) of an uplink resource allocation request. The PUCCH for one UE uses one resource block occupying different frequencies in each slot within the subframe. That is, two resource blocks allocated to the PUCCH are frequency-hopped in a slot boundary. FIG. 7 shows the case where a PUCCH having m=0, a PUCCH having m=1, a PUCCH having m=2, and a PUCCH having m=3 are allocated to the subframe.

In the case in which a channel state between an eNB and a UE is inferior, a relay node (RN) may be mounted between the eNB and the UE so as to provide a radio channel having a better channel state to the UE. In addition, by utilizing the RN in a cell boundary in which the channel state from the eNB is inferior, it is possible to provide a high-speed data channel and extend a cell service area. Currently, the RN is widely used as technology of solving a shadow area in a wireless communication system.

In the past, the RN was limited to a repeater function for amplifying and transmitting a signal. However, recently, the RN has been developed to an intelligent form. Further, RN technology is necessarily required to reduce cost consumed for establishing more eNBs and cost consumed for maintaining a backhaul network, to extend service coverage, and to improve data throughput. As RN technology has been gradually developed, it is necessary for a new wireless communication system to support an RN used in the conventional wireless communication system.

In a $3^{rd}$ generation partnership project long term evolution-advanced (3GPP LTE-A) system, as an RN for forwarding a link between an eNB and a UE has been introduced, two links having different attributes are applied to uplink and downlink carrier frequency bands. A link part between an eNB and an RN is defined as a backhaul link. Transmission performed using downlink resources in a frequency division duplex (FDD) or time division duplex (TDD) scheme is referred to as backhaul downlink and transmission performed using uplink resources in a FDD or TDD scheme is referred to as backhaul uplink.

Figure 9:
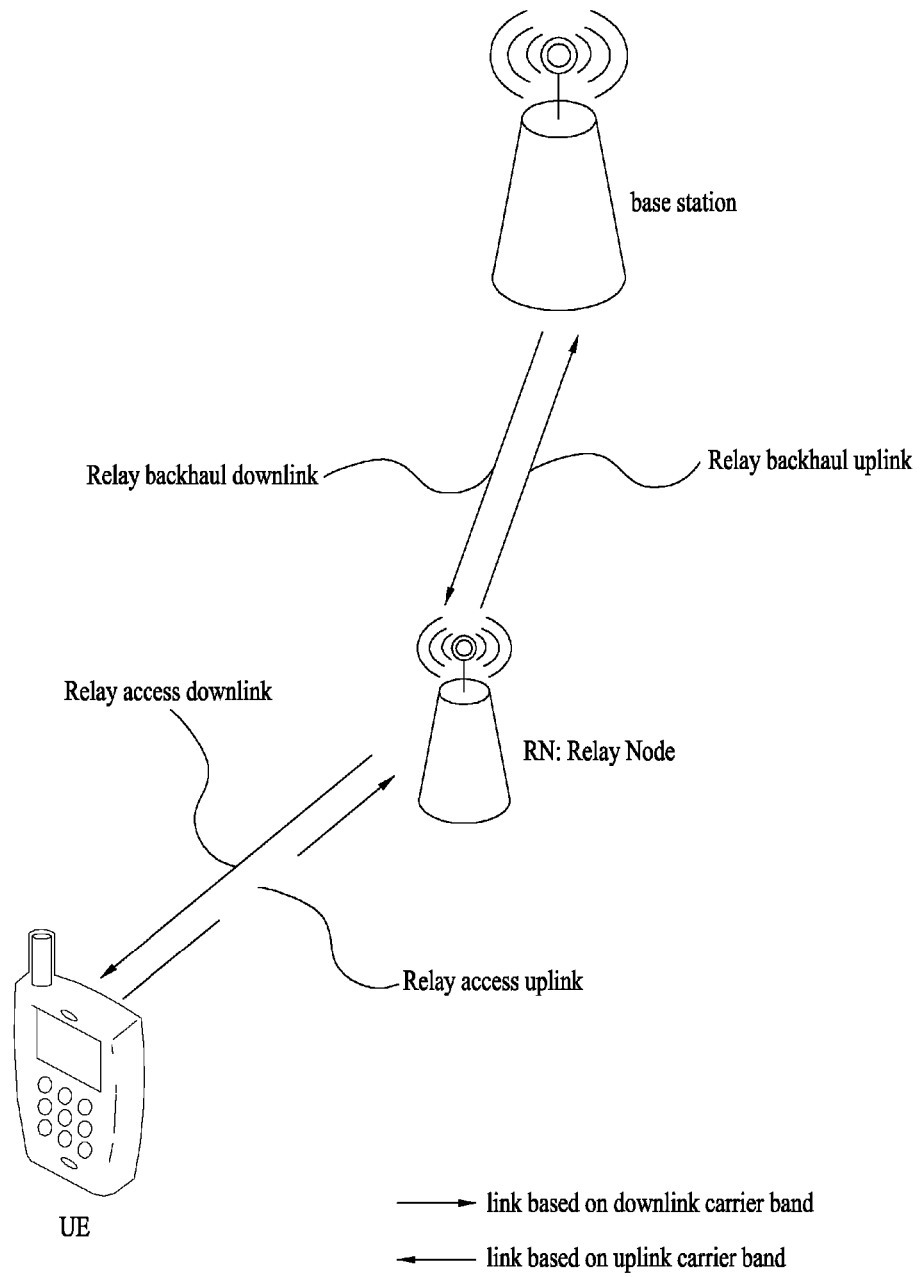
FIG. 9 is a diagram showing the configuration of a relay backhaul link and a relay access link in a wireless communication system.

FIG. 9 is a diagram showing the configuration of a relay backhaul link and a relay access link in a wireless communication system.

Referring to FIG. 9, as an RN for forwarding a link between an eNB and a UE has been introduced, two links having different attributes are applied to uplink and downlink carrier frequency bands. A link part between an eNB and an RN is defined as a relay backhaul link. Transmission performed using downlink frequency band (in case of frequency division duplex (FDD)) or downlink subframe (in case of time division duplex (TDD)) resources is referred to as backhaul downlink and transmission performed using uplink frequency band (in case of FDD) or uplink subframe (in case of TDD) resources is referred to as backhaul uplink.

A link part between an RN and a series of UEs is defined as a relay access link. Transmission performed using downlink frequency band (in case of frequency division duplex (FDD)) or downlink subframe (in case of time division duplex (TDD)) resources is referred to as access downlink and transmission performed using uplink frequency band (in case of FDD) or uplink subframe (in case of TDD) resources is referred to as access uplink.

The RN may receive information from the eNode-B through relay backhaul downlink and transmit information to the eNode-B through relay backhaul uplink. In addition, the RN may transmit information to the UE through relay access downlink and receive information from the UE through relay access uplink.

In association with the use of the band (or the spectrum) of the RN, the case where the backhaul link operates in the same frequency band as the access link is referred to as "in-band" and the case where the backhaul link and the access link operate in different frequency bands is referred to as "out-band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relay nodes, L3 (third layer) relay nodes, Type-1 relay nodes and Type-1a relay nodes.

The Type-1 relay node is an in-band relay node for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 relay node as a legacy eNodeB (an eNodeB which operates according to the LTE Release-8 system). That is, the Type-1 relay node has backward compatibility. The UEs which operates according to the LTE-A system regard the Type-1 relay node as an eNodeB different from the legacy eNodeB, thereby achieving performance improvement.

The Type-1a relay node has the same characteristics as the above-described Type-1 relay node except that it operates as an out-band relay node. The Type-1a relay node may be configured so as to minimize or eliminate an influence of the operation thereof on an L1 (first layer) operation.

The Type-2 relay node is an in-band relay node and does not have a separate physical cell ID. Thus, a new cell is not established. The Type-2 relay node is transparent to the legacy UE and the legacy UE does not recognize presence of the Type-2 relay. The Type-2 relay node can transmit a PDSCH, but does not transmit at least a CRS and a PDCCH.

In order to enable the RN to operate as the in-band relay node, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated at a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNB and the RN and the backhaul uplink transmission is performed in an uplink subframe of the eNB and the RN.

In the in-band relay node, for example, if the backhaul downlink reception from the eNB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated from each other (for example, on the ground or under the ground) in terms of geographical positions).

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed during such a gap. Such a gap may be set to configure a multicast broadcast single frequency network (MBSFN) subframe.

Figure 10:
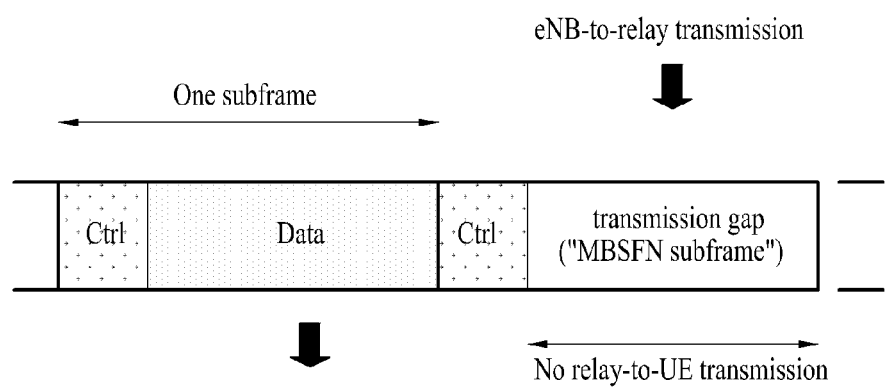
FIG. 10 is a diagram showing an example of relay-node resource partitioning.

FIG. 10 is a diagram showing an example of relay-node resource partitioning.

In FIG. 10, a first subframe is a general subframe, in which a downlink (that is, access downlink) control signal and data are transmitted from the RN to the UE, and a second subframe is an MBSFN subframe, in which a control signal is transmitted from the RN to the UE in a control region of the downlink subframe, but any signal is not transmitted from the RN to the UE in the remaining region of the downlink subframe. Since the legacy UE expects transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe (the second subframe)) set for the transmission of the downlink (that is, the backhaul downlink) from the eNB to the RN, the RN needs to transmit the access downlink in first N (N=1, 2 or 3) OFDM symbol intervals of the subframe, without receiving the backhaul downlink. Since the PDCCH is transmitted from the RN to the UE in the control region of the second subframe, it is possible to provide backward compatibility to the legacy UE served by the RN. While any signal is not transmitted from the RN to the UE in the remaining region of the second subframe, the RN may receive the signal transmitted from the eNB. Accordingly, the resource partitioning disables the in-band RN to simultaneously perform the access downlink transmission and the backhaul downlink reception.

The second subframe using the MBSFN subframe will now be described in detail. The control region of the second subframe may be a RN non-hearing interval. The RN non-hearing interval refers to an interval in which the RN does not receive a backhaul downlink signal and transmits an access downlink signal. This interval may be set to 1, 2 or 3 OFDM lengths as described above. The RN performs the access downlink transmission to the UE in the RN non-hearing interval and performs the backhaul downlink reception from the eNB in the remaining region. At this time, since the RN cannot simultaneously perform the transmission and reception in the same frequency band, it takes a certain length of time to switch the RN from the transmission mode to the reception mode. Accordingly, it is necessary to set a guard time (GT) to switch the RN from the transmission mode to the reception mode in a first portion of the backhaul downlink reception region. Similarly, even when the RN receives the backhaul downlink from the eNB and transmits the access downlink to the UE, a guard time (GT) to switch the RN from the reception mode to the transmission mode may be set. The length of the guard time may be set to values of the time domain, for example, values of k (k≥1) time samples Ts or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain set for the transmission of the backhaul downlink subframe, in order to maintain backward compatibility (the legacy UE cannot be supported if the guard time is set in the access downlink interval). The RN can receive a PDCCH and a PDSCH from the eNB in the backhaul downlink reception interval except for the guard time. Such PDCCH and the PDSCH are physical channels dedicated for RN and thus may be represented by an R-PDCCH (Relay-PDCCH) and an R-PDSCH (Relay-PDSCH).

Figure 11:
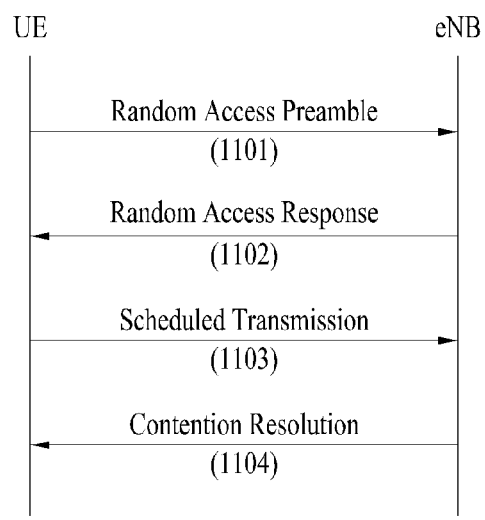
FIG. 11 is a diagram showing operation of a user equipment (UE) and a base station in a contention based random access procedure provided by an LTE system.

FIG. 11 is a diagram showing operation of a UE and an eNB in a contention based random access procedure provided by an LTE system.

Referring to FIG. 11, in step 1101, the UE may randomly select a single random access preamble from a set of random access preambles indicated through system information or a handover command, and select and transmit Physical Random Access Channel (PRACH) resources capable of transmitting the random access preamble. At this time, the preamble is called RACH MSG 1.

In step 1102, the UE attempts to receive its own random access response within a random access response reception window indicated by the eNB through the system information or the handover command, after the random access preamble is transmitted. More specifically, RACH MSG 2, that is, random access response information is transmitted in the form of a MAC PDU and the MAC PDU is sent via a PDSCH. In addition, a PDCCH is also sent in order to enable the UE to appropriately receive the information sent via the PDSCH. That is, the PDCCH includes information on the UE which should receive the PDSCH, frequency and time information of radio resources of the PDSCH and the transmission format of the PDSCH. If the UE successfully receives the PDCCH, the random access response transmitted via the PDSCH is appropriately received according to the information on the PDCCH. The random access response includes a random access preamble identity, UL grant, a temporary C-RNTI, a time alignment command, etc. The reason why the random access preamble identity is necessary is because random access response information for one or more UEs may be included in one random access response and thus it is necessary to indicate for which UE the uplink grant, the temporary C-RNTI and the time alignment command are valid. The random access preamble identity matches the random access preamble selected by the UE in step 1101.

Subsequently, in step 1103, if the UE has received the random access response valid for the UE, the UE processes all information included in the random access response. That is, the UE applies the time alignment command and stores the temporary C-RNTI. In addition, data which is stored in the buffer of the UE or newly generated data is transmitted to the eNB using the uplink grant. At this time, data transmitted via the uplink grant, that is, MAC PDU, is referred to as RACH MSG 3. The identity of the UE should necessarily be included in the data included in the uplink grant. This is because the eNB may not determine which UE performs the random access procedure in the contention based random access procedure and thus should identify the UE in order to perform contention resolution later. Here, there are two different schemes for including the UE identity. A first scheme is to transmit the UE's cell identity through UL grant if the UE has already received a valid cell identity allocated by a corresponding cell prior to the random access procedure. Conversely, the second scheme is to transmit the UE's unique identity if the UE has not received a valid cell identity prior to the random access procedure. In general, the unique identity is longer than the cell identity. If the UE has transmitted data through the UL Grant, the UE starts a contention resolution (CR) timer.

Finally, after the UE transmits the data including its own identity through the UL Grant included in the random access response, the UE waits for an indication from the eNB for contention resolution. That is, the UE attempts to receive the PDCCH in order to receive a specific message. Here, there are two schemes for receiving the PDCCH. As described above, the UE attempts to receive the PDCCH using its own cell identity if the identity transmitted via the UL Grant is a cell identity, and the UE attempts to receive the PDCCH using the temporary C-RNTI included in the random access response if the identity is its own unique identity. Thereafter, in the former scheme, if the PDCCH (that is, RACH MSG 4) has been received through its own cell identity before the contention resolution timer has expired, the UE determines that the random access procedure has been normally performed and completes the random access procedure. In the latter scheme, if the PDCCH has been received through the temporary C-RNTI before the contention resolution timer has expired, the UE checks data transferred by the PDSCH indicated by the PDCCH. If the unique identity of the UE is included in the data, the UE determines that the random access procedure has been normally performed and finishes the random access procedure.

Figure 12:
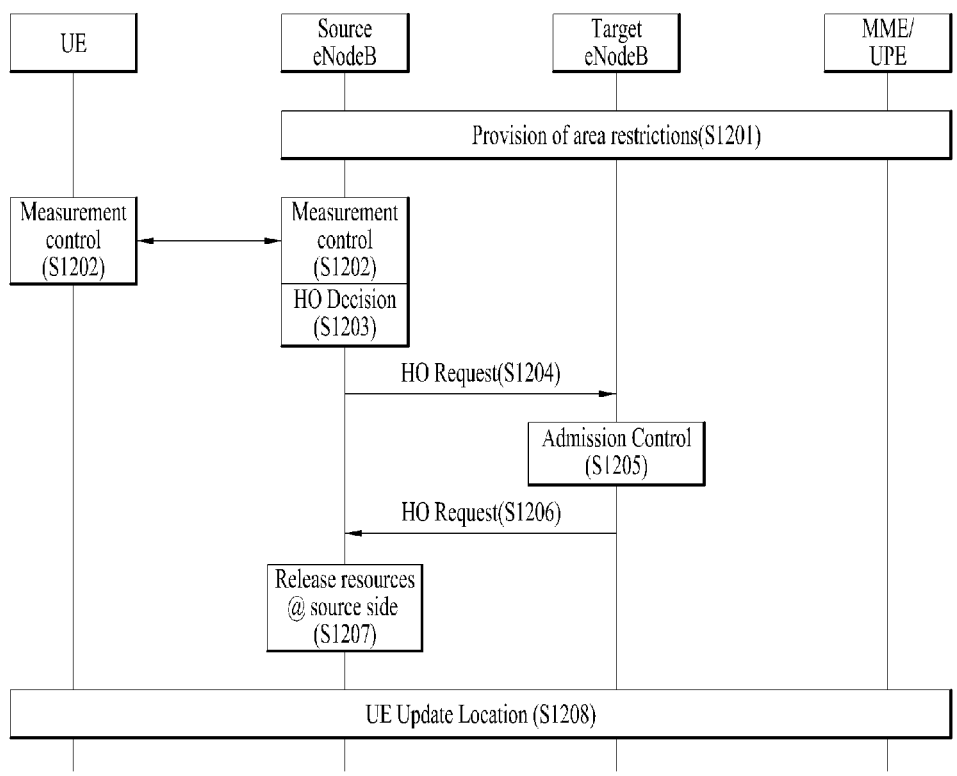
FIG. 12 is a diagram showing a handover procedure of moving a UE from a first wireless network node to a second network node to maintain connection when the UE changes a wireless network node connected in an E-UTRAN.

FIG. 12 is a diagram showing a handover procedure of moving a UE from a first wireless network node to a second network node to maintain connection when the UE changes a wireless network node connected in an E-UTRAN.

UE context includes area restriction information (S1201) and the UE performs measurement control according to a measurement process set by a source eNodeB (or a serving cell) (S1202). In addition, the source eNodeB receives measurement information from the UE and decides handover to a neighboring eNodeB (or a neighboring cell) (S1203).

Subsequently, the source eNodeB transmits a handover (HO) request message to a target eNodeB (or a target cell) (S1204), the target eNodeB determines whether the HO request message is allowed in consideration of wired/wireless resources thereof (S1205), and the target eNodeB transmits an HO response message to the source eNodeB (S1206).

Subsequently, the source eNodeB transmits an HO command to the UE (S1207) and the UE which has received the HO command message performs signaling for connection between the target eNodeB and Layer 1 and Layer 2. The signaling process of Layer 1 and Layer 2 includes a process of synchronization between the UE and the eNodeB (S1208).

The UE which has finished connection of Layer 1 and Layer 2 transmits an HO complete message to the target eNodeB (S1209) and the target eNodeB transmits the HO complete message to an MME/UPE (S1210). In addition, the MME/UPE transmits an HO complete ACK message to the target eNodeB (S1211).

The target eNodeB transmits a resource release message to the source eNodeB (S1212) and the source eNodeB which has received the resource release message releases all resources (S1213).

The source eNodeB transmits an HO command to the UE and starts to transmit a downlink user traffic block to the target eNodeB. The user traffic block may be transmitted by the PDCP layer of the MME/UPE or obtained by receiving the traffic block at the RLC of the eNodeB and adding a sequence number to the received traffic block. All traffic blocks are transmitted to the target eNodeB from a minimum traffic block, the reception of which is not completely confirmed although being transmitted from the target eNodeB to the UE.

Hereinafter, a handover procedure of an RN according to the present invention will be described. Since an RN which is mounted at a fixed position is continuously connected to a specific donor cell, a handover procedure for changing a serving cell is not necessary. However, if mobility is applied to an RN such that the RN moves, the RN needs to change a serving cell. In particular, if mobility of the RN is large, such a handover procedure is frequently performed.

In case of a backhaul link, since a donor cell delivers control information to an RN using an R-PDCCH, accurate demodulation and decoding of the R-PDCCH is very important. In case of the existing PDCCH, a UE may perform blind decoding in a predetermined search space with RNTI information thereof to detect a PDCCH. That is, the predetermined search space means that a serving cell does not need to separately provide information on the search space to the UE.

In contrast, in the current standard, since a serving cell informs an RN of a search space for an R-PDCCH using a higher layer signal, the R-PDCCH may not be decoded if RRC signaling is impossible. In this case, the RN performs handover.

If the RN performs handover, the RN transmits an RACH to a target cell and receives an RACH response message in downlink. At this time, the RACH response message is transmitted via an R-PDSCH and the location of the R-PDSCH transmitted to the RN may be confirmed by decoding the R-PDCCH. Accordingly, although the R-PDCCH needs to be decoded, the RN may not know the search space for the R-PDCCH. This is because RRC connection with the target cell is not currently established. Accordingly, since the RN cannot decode the R-PDCCH, the RACH response message may not be received. Hereinafter, methods of solving the above-described problems are proposed.

1) First, a default search space for an R-PDCCH may be set. The size of the default search space may be set to 1 RB or 1 RBG, to which the present invention is not limited. That is, the size of the default search space may be set to a specific RB or RBG.

In addition, the default search space may be set based on a cell ID. More specifically, since handover is performed at a boundary between cells, the default search space may differ between cells, for interference reduction or interference avoidance.

2) Next, a method of delivering information on a search space for an R-PDCCH from a serving cell to a target cell may be considered. In this case, the target cell transmits an RACH response message based on the information on the search space for the R-PDCCH and an RN performs blind decoding with respect to the R-PDCCH at the same location as the search space set by the serving cell and receives an RACH response message. If this method is used, the RN does not require separate higher layer signaling.

During the handover procedure, since the serving cell performs a procedure of forwarding data to the target cell, the information on the search space may be easily delivered to the target cell. In addition, the information on the serch space is transmitted from the serving cell to the target cell and the relay node. The information on the search space may include information required to decode the R-PDCCH and may include, for example, search space setting information, a reference signal type, information on whether cross interleaving is applied, etc. The information on the search space may be delivered immediately before HO starts.

3) As another method, a target cell may set a search space for an R-PDCCH and send and share information on the search space to and with a serving cell before handover is performed. In this case, the serving cell which has started a handover procedure may send the information on the search space received from the target cell to the RN through higher layer signaling or handover message.

Further, a method of, at a serving cell, setting a search space for an R-PDCCH of a target cell and sending information on the set search space to the target cell and an RN the may be considered. In this case, the serving cell and the target cell need to share information for setting the search space in advance.

As described above, if the serving cell and the target cell use the same search space, the above-described information does not need to be sent to the RN.

4) A method of, at an RN, directly sending information on a search space for an R-PDCCH to a target cell may be considered. Since the RN is an eNB, transmission between the RN and the target cell may be performed through a wireless X2 interface. Accordingly, the information on the search space may be sent through an interface similar to the existing X2 interface, that is, through higher layer signaling or a physical channel.

5) The target cell sends an RACH response message using a method different from an existing method so as to solve the above-described problems. More specifically, the R-PDSCH including the RACH response message is configured to be transmitted only a specific resource region. The RN may receive the RACH response message in a predetermined resource region. The target cell may allocate a specific resource region to only the RACH response message transmitted by the RN so as to minimize collision with a conventional handover procedure.

6) A method of switching an RN to a UE mode upon handover, temporarily stopping a service provided to a relay cell, and receiving an RACH response through a BCH and a PDCCH may be considered. If an RACH procedure is completed or finished, the RN may be switched to an RN mode to provide service to an RN cell.

7) A method of designing and utilizing a relay node-RACH (R-PRACH) instead of an existing RACH if the RN performs handover may be considered. In this case, a non-contention based RACH may be designed so as to attempt connection without collision with another UE or another RN.

Although the above-described embodiments are described in terms of the RN, the embodiments are applicable to general UEs. For example, for inter-cell interference avoidance, a PDCCH may be transmitted in a data region (this may be referred to as an E-PDCCH), instead of a control region. Even in this case, it may be difficult to receive the random access response message. Accordingly, even if the random access response message is received through blind decoding of the E-PDCCH, the above-described methods are applicable.

Figure 13:
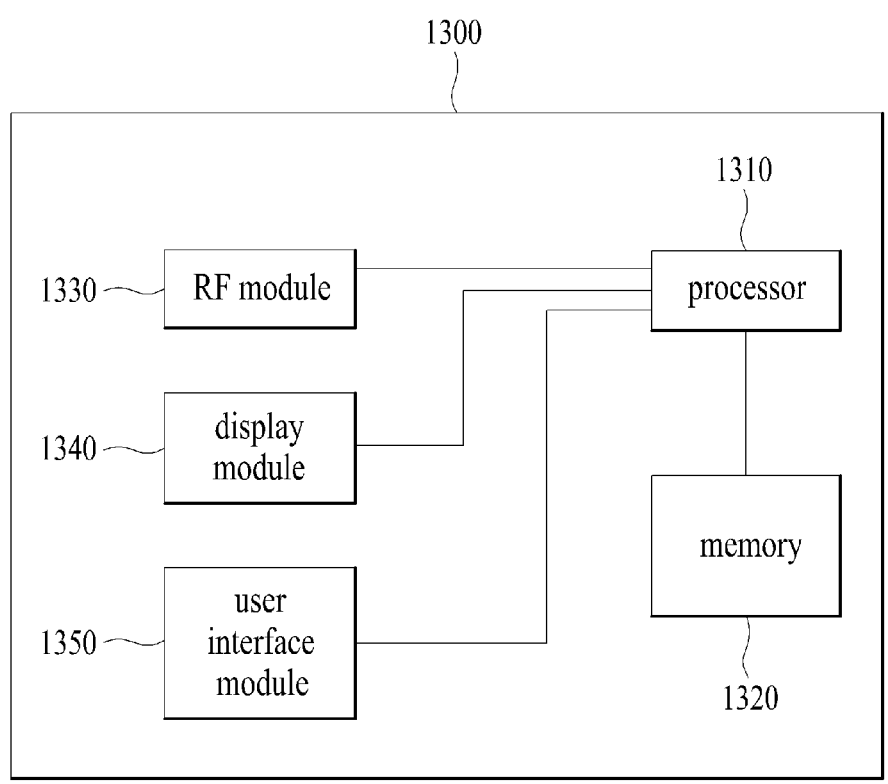
FIG. 13 is a block diagram showing the configuration of a communication apparatus according to an embodiment of the present invention.

FIG. 13 is a block diagram showing the configuration of a communication apparatus according to an embodiment of the present invention.

Referring to FIG. 13, a communication apparatus 1300 includes a processor 1310, a memory 1320, a Radio Frequency (RF) module 1330, a display module 1340 and a user interface module 1350.

The communication apparatus 1300 is shown for convenience of description and some modules thereof may be omitted. In addition, the communication apparatus 1300 may further include necessary modules. In addition, some modules of the communication apparatus 1500 may be subdivided. The processor 1310 is configured to perform an operation of the embodiment of the present invention described with reference to the drawings. For a detailed description of the operation of the processor 1310, reference may be made to the description associated with FIGS. 1 to 12.

The memory 1320 is connected to the processor 1310 so as to store an operating system, an application, program code, data and the like. The RF module 1330 is connected to the processor 1310 so as to perform a function for converting a baseband signal into a radio signal or converting a radio signal into a baseband signal. The RF module 1330 performs analog conversion, amplification, filtering and frequency up-conversion or inverse processes thereof. The display module 1340 is connected to the processor 1310 so as to display a variety of information. As the display module 1340, although not limited thereto, a well-known device such as a Liquid Crystal Display (LCD), a Light Emitting Diode (LED), or an Organic Light Emitting Diode (OLED) may be used. The user interface module 1350 is connected to the processor 1310 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and an RN. Specific operations to be conducted by the base station in the present invention may also be conducted by an upper node of the base station as necessary. In other words, it will be obvious to those skilled in the art that various operations for enabling the base station to communicate with the UE in a network composed of several network nodes including the base station will be conducted by the base station or other network nodes other than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method of setting a search space for handover of a relay node in a wireless communication system and an apparatus therefor to a 3GPP LTE system has been described, the present invention is applicable to various wireless communication systems in addition to the 3GPP LTE system.

The invention claimed is:

1. A method for performing a random access procedure for handover to a target cell at a relay node in a wireless communication system, the method comprising:
   transmitting a random access preamble to a target cell;
   receiving a downlink signal from the target cell;
   performing blind decoding with respect to the downlink signal and acquiring a relay node-physical downlink control channel (R-PDCCH); and
   receiving a random access response message based on the R-PDCCH,
   wherein search space for performing blind decoding is located in a data region of a subframe,
   wherein the search space is determined based on information on the search space, and
   wherein the information on the search space is sent from the target cell to a serving cell of the relay node and is signaled from the serving cell to the relay node.

2. The method according to claim 1, wherein the information on the search space is included in a handover response message sent from the target cell to the serving cell.

3. The method according to claim 1, wherein the serving cell and the target cell set the same search space for the relay node.

4. The method according to claim 1, wherein the information on the search space is signaled from the serving cell to the relay node through a higher layer signal.

5. A relay node in a wireless communication system, the relay node comprising:
   a wireless communication module configured to transmit a random access preamble to a target cell and to receive a downlink signal from the target cell; and
   a processor configured to perform blind decoding with respect to the downlink signal, to acquire a relay node-physical downlink control channel (R-PDCCH), and to detect a random access response message based on the R-PDCCH,
   wherein search space for performing blind decoding is located in a data region of a subframe,
   wherein information on the search space is sent from the target cell to a serving cell of the relay node and is signaled to the relay node, and
   wherein the search space is determined based on the information on the search space transmitted from the target cell through the serving cell.

6. The relay node according to claim 5, wherein the information on the search space is included in a handover response message sent from the target cell to the serving cell.

7. The relay node according to claim 5, wherein the serving cell and the target cell set the same search space for the relay node.

8. The relay node according to claim 5, wherein the information on the search space is signaled from the serving cell to the relay node through a higher layer signal.

* * * * *